Patented May 7, 1935

2,000,777

UNITED STATES PATENT OFFICE 2,000,777

FILTERING PRODUCT AND PROCESS OF MAKING THE SAME

Corwin R. Minton, Los Angeles, Calif., assignor of one-third to William B. Phillips and one-third to Burdick R. Ells, both of Los Angeles, Calif.

No Drawing. Application April 18, 1933, Serial No. 666,734

5 Claims. (Cl. 210—205)

My invention relates to integral ceramic products for filtering fluids, and to processes of making such products.

Integral ceramic products heretofore used in filtration operations have the undesirable physical characteristics and properties which permitted the solid matter being removed by passage of a fluid containing it through the integral and porous product, to penetrate into the surface and internal pores or voids of the product, eventually clogging and sealing them off until a practical rate of filtration flow could no longer be maintained. The quantity of fluid which passes through these porous products before diminution or cessation of the flow occurs, is often so small that it renders economical filtration by such products impossible.

In present practice, an attempt is made to clean these filter products either by counter-pressure flow of a fluid through them in a direction opposite to the flow during filtration; by dissolving the solids from the pores with acids if they are acid soluble, without damage to the filter; and by burning the solids out with a high heat, if they are of an organic combustible nature. In any case, the methods of cleaning are not an entire success as the solids are rarely removed to the extent of restoring the filter to its original porosity and flow rate; also, the operation if thoroughly done is usually injurious to the structure of the filter. The above described methods of cleaning diminish in effectiveness with each cycle, and after a relatively few cycles it is found necessary to replace the filter with a new one.

It is accordingly an object of my invention to provide a porous ceramic product for filtration purposes of such surface and internal pore characteristics that the solids being removed from fluids passing through the product do not enter or embed themselves into the internal pore structure of the product, but instead, lay upon or exceedingly close to the surface of the filter and form a cake thereon of increasing depth as the process of filtration proceeds, without progressively penetrating into the body of the filter structure.

A further object is to provide a ceramic product for filtration which is of such hardness that its surface may be easily scratched or scraped clean by the stroke of a steel blade or other suitable instrument. This method of cleaning has the advantage of both removing the cake of solid matter built upon the surface and a minute thickness or layer from the filter surface into which the solid particles may have slightly penetrated, so that a new and clean surface is quickly and easily presented to the fluid flow. These described cleanings may be repeated a multitude of times, each of which removes a minute thickness from the filter body until it becomes too thin to withstand the stresses of usage and must be replaced by a new one of original thickness.

Such a porous ceramic product for filtration whose body structure is low in the scale of hardness and having an easily abraided quality, possesses a certain property of self-cleaning when cakes of filtered solids built upon its surface are removed or pulled away therefrom. The gripping of the filter cake upon the tips of the particles composing the filter surface is so great that these tips are broken off and remain embedded in the contacting surface of the filter cake. Removal of the cake thus automatically produces a fresh porous surface for the next filtration cycle.

This breaking away of the particle tips which are normally of light color can readily be seen if the filter cake is of black carbonaceous material as the surface of this filter cake which has contacted the filter surface presents a white salted surface which consists of the tips of the filter surface particles embedded firmly in the surface of the filter cake. Under these conditions scraping of the filter is often not necessary, and if it is done at all so little material need be removed that the life of the filter is extraordinarily prolonged.

It is also an object of my invention to provide a filtering product which will not disintegrate or lose any of its filtering properties when subjected to destructive acids or extremely high temperatures, thus rendering the product particularly applicable to the filtration of acid containing fluids and fluids requiring extremely high temperatures for effective filtration.

A further object of my invention is the provision of a process of making a filtering product characterized as delineated above, and which process is itself characterized by the step of subjecting the materials of which the product is formed to any pressure which does not exceed in degree the crushing strength of the particles of filtering material contained in the product, and whereby, the structural characteristics of these particles of filtering material are preserved in the ultimate product.

I will describe only one form of filtering product, and one process of making the same, each embodying my invention, and will then point out the novel features thereof in claims.

In accordance with my invention I make products of this class by employing such varying ingredients and processes of manufacture as will produce a product best suited to the specific type or method of filtration required of it. The size and ratio of sizes of ingredient particles, the amount of vitreous ceramic bonding material, the pressure used in forming, and the various operations in time and treatment during compounding of the body mixture, all may be substantially varied in order to produce a range or line of articles each having a certain porosity, density, and strength to suit a specific demand of practical filtration.

In the broad concept of my invention, I use siliceous ash residue produced by the burning of any form of vegetation or plant life whose body parts produce a siliceous ash when suitably burned. Vegetation of the water growing variety is particularly desirable for the purpose because, when burned, it produces a highly siliceous ash. The siliceous grains or particles constituting such an ash are of a peculiar splintery and feathery nature, and by reason of these physical characteristics the ash when properly compounded with other ingredients and suitably treated and processed, functions to produce that of my porous filtration product which renders it impenetrable to solids contained in fluids.

To attain this result, and yet produce a filtering body immune to destructive acids and extremely high temperatures, I employ a ceramic material which is vitrifiable within the range of ordinary ceramic firing operations. This material is combined in my process to cause the particles of siliceous ash to be bonded to each other only at their points of contact, and to thereby form an integral body having innumerable intercommunicating pores or voids. Not that the provision of an integral body of great porosity effects this non-penetrable feature, but because of the splintery and feathery nature of the siliceous ash particles, the walls of the pores or voids are, in consequence, of the same structural nature. Thus particles of solids contained in a fluid upon entering these voids, will be engaged by or between the tips or pointed projections of the siliceous ash particles and thereby prevented from penetrating the voids to any appreciable extent. Resultant of this functioning of the ash particles, the solids are caused to accumulate on the surface of the filter body, while the filtered fluid is free to flow through the voids to be collected at the lower side of the filter body.

The vitreous ceramic bonding material employed may be ground glass, glaze, or flux, and preferably in the proportion of 20 parts to 80 parts by weight of siliceous ash. It will be understood, however, that these precise proportions can be varied as long as there is no such excess of the bonding material as to fill the pores or voids between the particles of siliceous ash.

A fluid filtering product made with the materials above described, although possessing the property of being impenetrable to solids and low in the scale of hardness, is not highly desirable because it presents certain difficulties in making, and the final product is not of uniform density but soft at its edges.

As a specific form of filtering product, I employ rice ash or swamp grass ash which has been ground to the desired grain size in accordance with the particular use to which it is to be put, and glass reduced by grinding to the desired fine state of division. The grains or particles of rice ash are bonded at their points of contact only by firing the ground glass to a fluxing glass which unites with the grains and upon cooling forms a rigid bond or connection between them at their points of contact, so that the final product presents an integral structure having innumerable intercommunicating pores or voids.

To bond the rice ash particles only at their points of contact and uniformly throughout the mass, it is necessary that any excess of ground glass be absorbed in order to prevent it from flowing into and filling or sealing the pores or voids. To insure such absorption and yet not reduce but increase the porosity and, hence, increase the filtering property of the final product, I add a quantity of finely ground plastic clay or kaolin. This clay content also acts as a temporary binder during the forming, drying, and early stage of the firing operation before and until the glass is sufficiently softened to unite and bond the rice ash particles.

This clay also increases the structural strength of the final product to successfully withstand the stresses to which it is subjected when in use, and yet it is not increased in hardness over the product made without clay so that it is still capable of being easily abraded.

In addition to the plastic clay I may also add any one of the known organic gums or binders as an ingredient to develop still greater strength in order that the processing and manufacturing of the product may be aided until the final firing operation produces the ultimate bond and integral strength. Thus it will be understood that the use of organic gum is not necessary but desirable.

As a specific example of the composition of one satisfactory product, the following ingredients in the proportions mentioned may be employed:

| | Parts by weight |
|---|---|
| Rice ash | 75 |
| Ground glass | 20 |
| Plastic clay | 5 |
| Gum arabic | 2 |
| | 102 |

Another composition may be constituted as follows:

| | Parts by weight |
|---|---|
| Rice ash | 60 |
| Ground glass | 30 |
| Plastic clay | 10 |
| Gum arabic | 2 |
| | 102 |

These two compositions when fired at the same temperature will in the final product have entirely different physical and filtering characteristics.

The former will be exceedingly open and porous, quite soft and easily abraded; also, the flow rate of fluids through the pore structure will be rapid. The latter composition will produce an article of greater density, smaller pore size and a reduced rate of filtration flow. It will also offer greater resistance to scraping with a steel blade.

These latter conditions are brought about by the higher content of vitreous bonding material. To offset the danger of this bond content being in excess and sealing the pores, the plastic clay content has been increased to absorb any excess which might be formed during firing.

As a specific process of making my product, I mix together the desired proportions of rice ash, vitreous bonding material, and plastic clay and moisten the mixture with water in which the organic gum has been previously dissolved. Just sufficient water is added that the several ingredient particles will adhere together and hold their form when lightly subjected to pressure. This moistened mixture is then placed in a mold of suitable shape and dimensions and submitted to pressure by the die plates of a ceramic machine commonly known as a dry press. These presses are adjustable as to the pressure which may be applied to any substance placed within their molds and I take advantage of this pressure control to vary the density, pore size and strength of my filtering body. Light pressures produce a light open structure of large pore size while heavy pressures pack the granular ingredients together and produce a dense body of small pore size. This increased density increases the advantage of the vitreous bonding material in its contact with the non-fluxing particles so that a body of greater hardness is also produced.

It is important that in no instance are the ingredients subjected to a pressure which exceeds the crushing strength of the particles of siliceous ash because it is vital to the non-penetrating property of my product that the natural splintery and feathery structure of the individual ash grains be completely preserved.

After subjecting the mass to the desired pressure to form the body, it is dried and then burned in a suitable ceramic kiln at a temperature necessary to soften the vitreous bonding material and unite it to the less fusible ash particles. The limiting temperatures of this firing operation are as a minimum 950° C. which is the lowest fusing point of a vitreous ceramic bond, and as a maximum 1500° C. which is the average deformation and fusing temperature of siliceous vegetable ash.

After submitting the formed mass to the desired temperature within the above range for a suitable length of time, e. g. twenty-four hours, it is cooled slowly for a similarly long time. In this firing operation the rice ash particles are bonded together and permanently united by the vitreous ceramic bond, producing a rigid skeleton body structure interspaced with numerous connecting pores or voids.

Although I have herein described only one form of filtering product and one form of making the same, each embodying my invention, it is to be understood that various changes and modifications may be made herein without departing from the spirit of the invention and the spirit and scope of the appended claims.

What I claim is:

1. A porous ceramic filtering body, comprising; a rice ash; and a vitreous ceramic bonding material.

2. A porous ceramic filtering body, comprising; a rice ash; a vitreous ceramic bonding material; and a clay.

3. A filter body, comprising; siliceous particles of a splintery and feathery nature; a vitreous ceramic material bonding said particles together to form a rigid and integral body; and a clay in such proportion as to absorb any excess of bonding material so that the latter is caused to bond the siliceous particles together only at their points of contact.

4. A porous ceramic filtering body, comprising; siliceous particles of a splintery and feathery nature; and a vitreous ceramic bonding material.

5. A porous ceramic filtering body, comprising; siliceous particles of a splintery and feathery nature; a vitreous ceramic bonding material; and a clay.

CORWIN R. MINTON.